Figure 3:
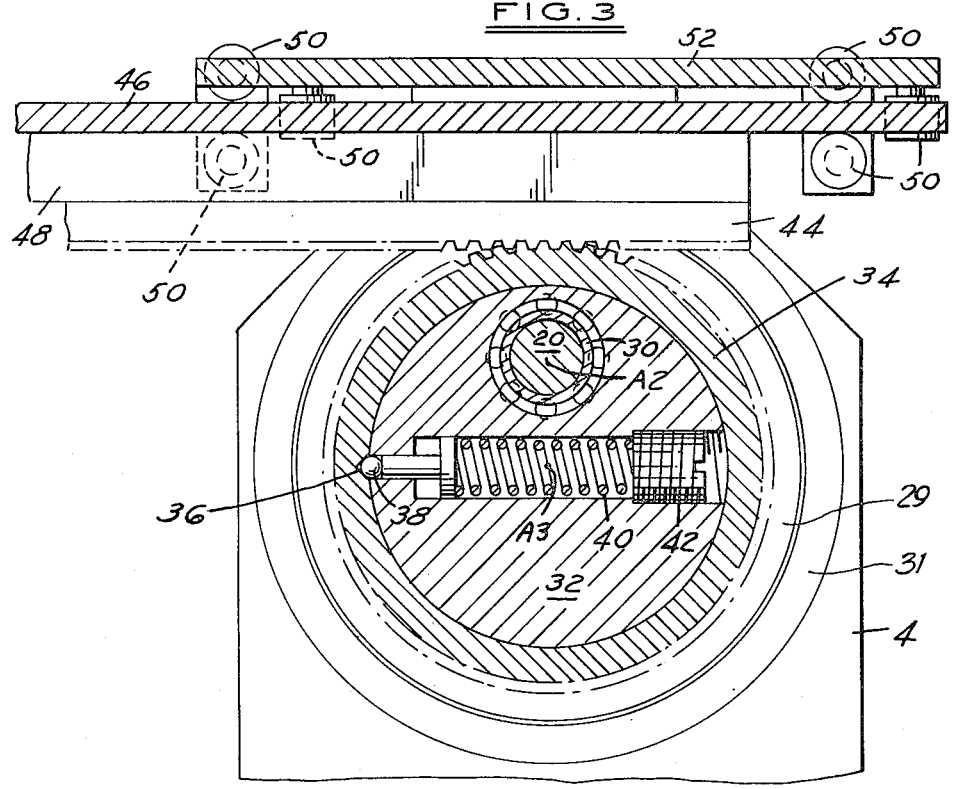

United States Patent [19]
Brems

[11] 3,857,292
[45] Dec. 31, 1974

[54] LINEAR INDEXING MECHANISM

[76] Inventor: John Henry Brems, 32867 White Oaks Trl., Birmingham, Mich. 48010

[22] Filed: Apr. 30, 1973

[21] Appl. No.: 355,700

[52] U.S. Cl............................ 74/52, 74/29, 74/805
[51] Int. Cl............................................ F16h 37/12
[58] Field of Search .................. 74/52, 29, 805, 804

[56] References Cited
UNITED STATES PATENTS

| | | | |
|---|---|---|---|
| 2,199,625 | 5/1940 | Fernbrugg.............................. | 74/52 |
| 2,223,100 | 11/1940 | Foster..................................... | 74/52 |
| 2,309,047 | 1/1943 | Culbertson............................. | 74/52 |
| 2,782,646 | 2/1957 | Christian................................ | 74/52 |
| 3,208,293 | 9/1965 | Boehm.................................... | 74/805 |

FOREIGN PATENTS OR APPLICATIONS

| | | | |
|---|---|---|---|
| 416,850 | 3/1946 | Italy....................................... | 74/805 |
| 586,899 | 3/1958 | Italy....................................... | 74/805 |

*Primary Examiner*—Wesley S. Ratliff, Jr.
*Attorney, Agent, or Firm*—Barnes, Kisselle, Raisch & Choate

[57] ABSTRACT

A mechanism for providing a cycloidal output motion for an output member in a lineal direction using a constant velocity rotary input motion driving an off-center input shaft and drive gear and utilizing a secondary motion to influence the position of the drive gear in relation to the output member and the acceleration and deceleration of the output member. A compact embodiment utilizes a ring gear and planetary and a reaction motion to provide the secondary input.

11 Claims, 11 Drawing Figures

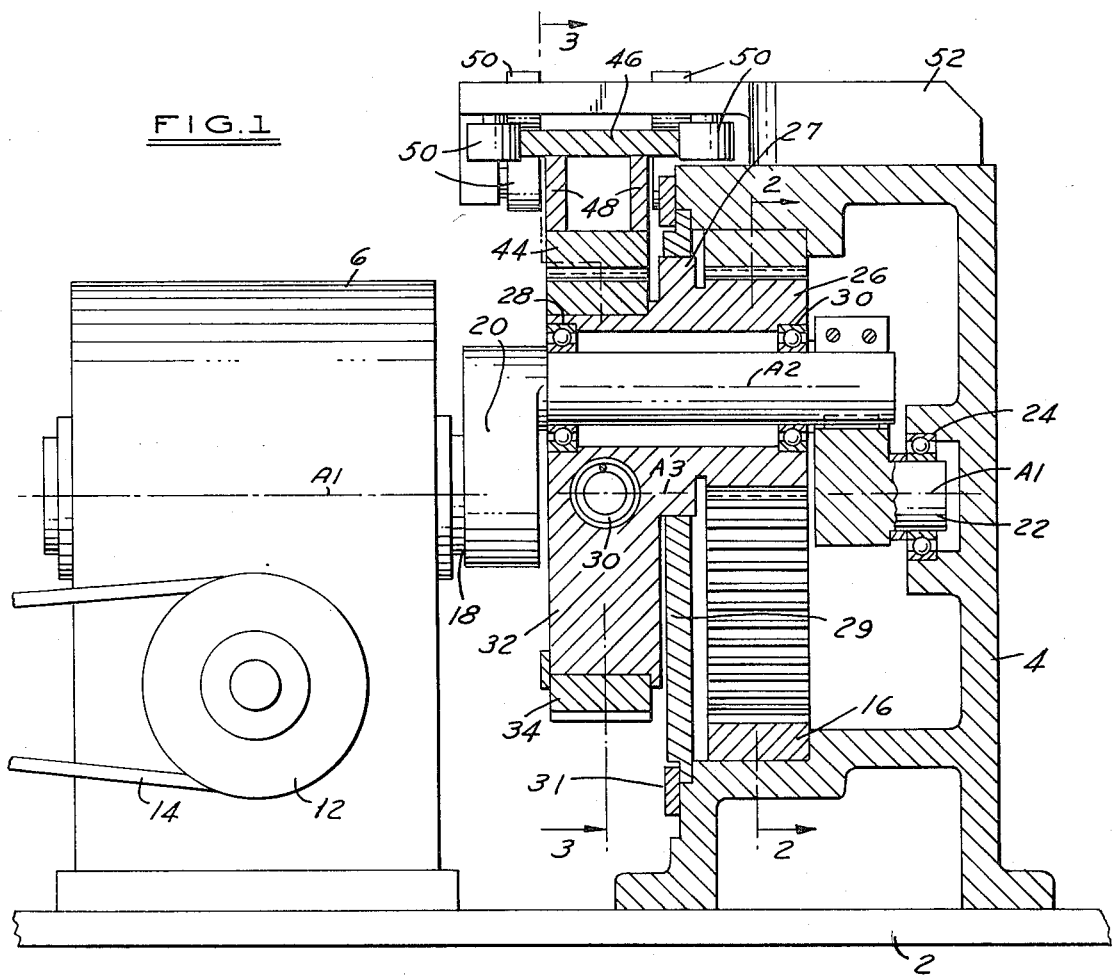

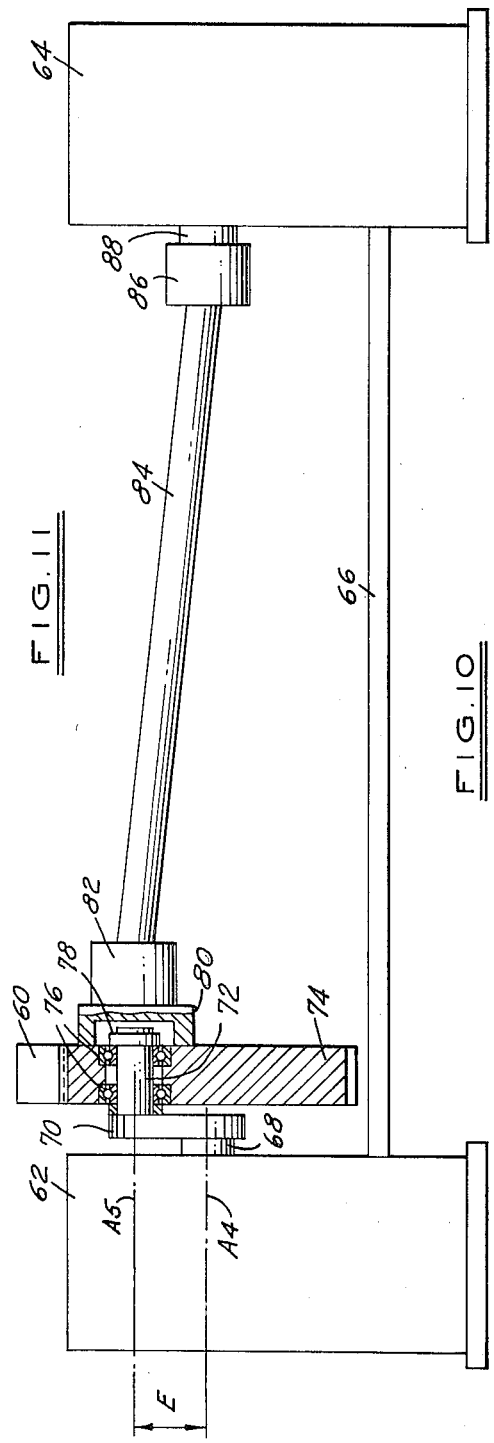
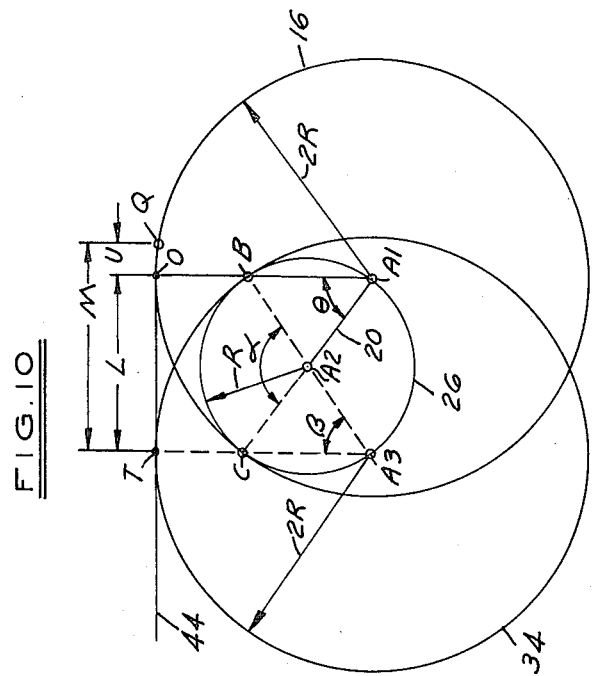
FIG.11
FIG.10

LINEAR INDEXING MECHANISM

This invention relates to a Linear Indexing Mechanism and more particularly to a device for achieving a cycloidal output motion of an output member in a prescribed path.

It is an object to provide a compact drive mechanism relatively simple in construction from the point of view of machining which, with a simple constant velocity input, can produce a cycloidal output with a suitable hi-torque acceleration and deceleration and a rapid intermediate traverse.

It is a further object to provide a cycloidal output motion in a single constant velocity input to maintain a drive relationship between the output member and a drive gear while simultaneously achieving the desired acceleration and deceleration characteristics.

Another object is the provision of a cycloidal drive which has a simple overload release which will prevent damage to mechanism in the event of an overload or accidental jam-up in the output mechanism.

A still further object is a mechanism which achieves the secondary input by a reaction ring gear and planetary which maintains the drive gear contact with the output member while influencing the output to the proper acceleration and deceleration.

Other objects of the invention will be apparent in the following description and claims taken with the accompanying drawing in which there is disclosed the principles of operation of the invention and the best mode presently contemplated for the practice thereof.

Drawings accompany the disclosure and the various views thereof may be briefly described as:

FIG. 1, a view of a first modification assembly in section showing the relationship of the various parts.

Figure 2:
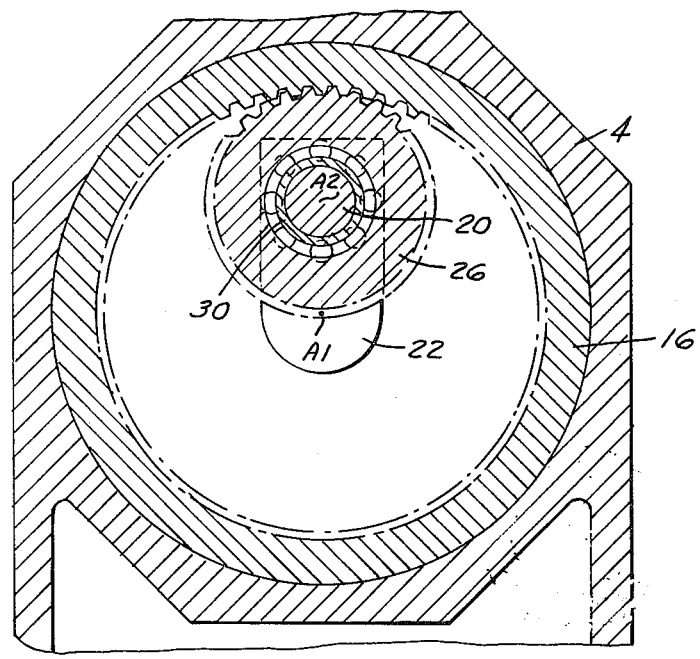

FIG. 2, a sectional view on line 2—2 of FIG. 1.

FIG. 3, a sectional view on line 3—3 of FIG. 1.

FIG. 4, a plan view of the assembly.

FIGS. 5 to 9, a series of diagrammatic views illustrating the parts in sequential positions through a cycle of operation.

FIG. 10, a line presentation showing the basis for the mathematical analysis of the system.

FIG. 11, a second embodiment illustrating an independent secondary input source in the form of a constant velocity rotary source.

Referring to FIGS. 1, 2, 3 and 4, a base 2 supports a frame 4 and a gear reducer 6. The gear reducer 6 is driven by a suitable motor 8, through pulleys 10 and 12 and belt 14. The frame 4 supports a stationary internal gear 16 whose axis is concentric with an output shaft 18 at the output axis A1 of the gear reducer 6. The output shaft 18 of the gear reducer 6 drives a crank cheek and eccentric crankshaft 20 on axis A2 which is supported at its outboard end through a bolted-on crank extension shaft 22 whose outboard end is again concentric with axis A1 and is supported in bearing 24 in the frame 4.

The crankshaft 20 axis A2 is parallel to the gear reducer output shaft 18 axis A1, and the distance from axis A1 to axis A2 is one-half of the pitch radius of the internal gear 16.

A planet gear 26 is mounted on the crankshaft 20 through bearings 28 and 30. This planet gear 26 has a pitch diameter one-half the pitch diameter of the internal gear 16 and the teeth of the two gears 16 and 26 are suitably formed to mesh with each other.

An eccentric hub 32 extending from the planetary gear is made integral with the planetary gear 26. The axis A3 of this hub 32 at the left-hand end is parallel to the axis A2 of the planetary gear 26 and displaced from A2 a distance equal to the pitch radius of the planetary gear 26. Between the hub 32 and the planetary gear 26 is a circular section 27 cooperating with a rotating shield plate 29, held in place by a ring 31 which provides a seal for the mechanism.

A drive gear 34 is rotatably and concentrically mounted to the hub 32 on axis A3. A notch 36 on the internal diameter of the drive gear 34 is suitably formed to mate with a detent roller 38 confined in the hub 32 and loaded outward into the notch 36 by a spring 40 held in place by a retainer 42. Ordinarily the drive gear 34 and the hub 32 rotate as a unit during normal operation; the purpose of the detent roller 38 is to permit the drive gear 34 to break free from the hub 32, in the event of some type of external overload, to prevent damage to the gears.

Figure 5:
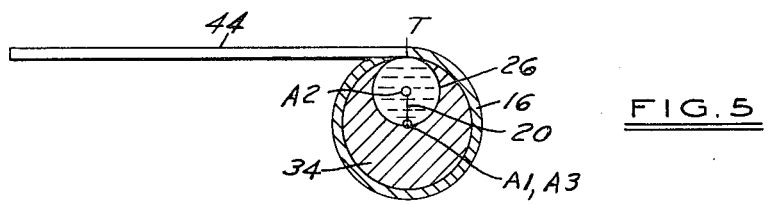
Figure 9:
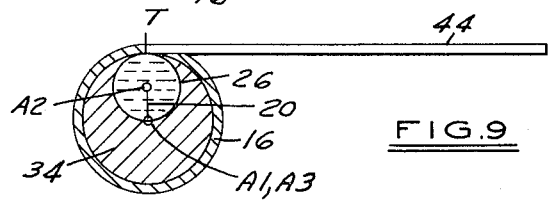

An elongate rack 44 is mounted to an output plate 46 through spacers 48. The rack 44 is suitably formed to mesh with the gear 34. The plate 46 is supported and guided in rollers 50 mounted in a bracket 52 bolted to the top of the frame 4. This permits the plate 46 and rack 44 to move lineally in the rollers 50 as the rack 44 is driven by the gear 34. The total rack 44 output stroke in one direction is equal to the pitch circumference of the gear 34. At each end of the stroke the axes A1 and A3 are coincident as shown in FIGS. 1, 5 and 9.

Operation: The output stroke requires one revolution of the crank 20 and can best be described by reference to FIGS. 5 to 9 which are a set of sequential schematic diagrams of the principal components during a typical index motion. In FIG. 5, all components are shown in their positions when the rack 44 is in dwell at one end of its stroke. At this point a substantial angular movement of the crank 20 will cause only a very slight movement of the rack 44. Axes A1 and A3 are substantially coincident, and axis A2 lies on the line perpendicular to the rack 44 pitch line through the point of tangency with gear 34. This point of tangency is designated at T in FIGS. 5–9.

Figure 6:
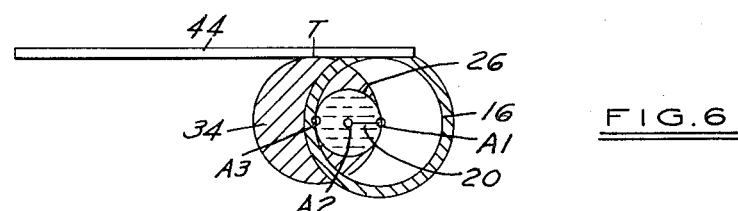

After the crank 20 has rotated 90° in the counterclockwise direction about axis A1, the condition shown in FIG. 6 is reached. The planetary gear 26 has rotated 180° clockwise relative to crank 20, or 90° clockwise, with respect to the fixed frame; therefore, the gear 34 has also rotated 90° clockwise with respect to the frame, while its centerline A3 has shifted to the left a distance equal to its pitch radius. During this interval, the rack 44 has moved slightly to the right while smoothly accelerating in that direction.

Figure 7:
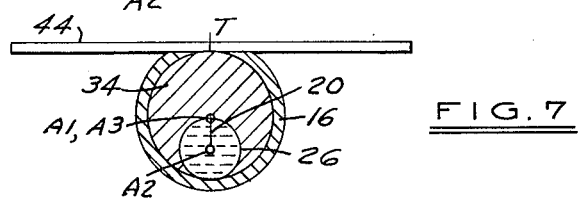

After the crank 20 has rotated an additional 90° (180° total) in the counterclockwise direction about axis A1, the condition shown in FIG. 7 is reached. The planetary gear 26 has now rotated 360° total clockwise relative to crank 20, or 180° total clockwise with respect to the fixed frame; therefore, the gear 34 has also rotated 180° clockwise with respect to the frame, while its centerline A3 has returned to a position substantially coincident with the fixed axis A1. It can be seen that at this time the rack 44 has moved a total distance equal to one-half of the pitch circumference of gear 26 or through one-half of its total stroke. It is at this point that the rack 44 has reached its maximum velocity.

Figure 8:
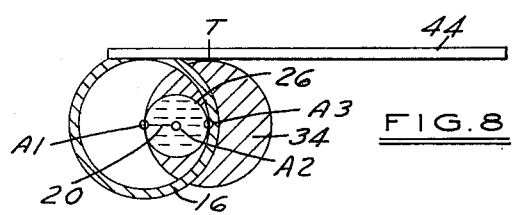

After the crank 20 has rotated another additional 90°, or 270° total, in the counterclockwise direction about axis A1, the condition shown in FIG. 8 is reached. The planetary gear 26 has now rotated 540° total clockwise relative to the crank 20, or 270° total clockwise with respect to the fixed frame; therefore, the gear 34 has also rotated 270° clockwise with respect to the frame, while its centerline A3 has moved to the right a distance equal to its pitch radius. The rack 44 has moved to the right through an increment equal to its movement between FIGS. 6 and 7 and therefore has almost reached the ends of its stroke.

After the crank 20 has rotated another additional 90°, or 360° total, in the counterclockwise direction about axis A1, the condition shown in FIG. 9 is reached. The planetary gear 26 has now rotated 720° total clockwise relative to the crank 20 or 360° total clockwise with respect to the fixed frame; therefore, the gear 34 has also rotated 360° clockwise with respect to the frame. The axis A3 is again coincident with axis A1 and all components, except the rack 44, are back in the same position as shown in FIG. 5. The rack 44 is again in dwell but has indexed forward a distance equal to the pitch circumference of the gear 34.

During the index sequence described above, the rack accelerates smoothly from zero in FIG. 5, reaches a maximum velocity at the point shown in FIG. 7, and then decelerates smoothly during the last half of its movement till a dwell is again reached in FIG. 9. This can be qualitatively seen by reference to FIGS. 5–9. The exact equation of motion will now be derived.

FIG. 10 is a schematic displacement diagram showing the output displacement as a function of the input crank angle. Prior to any input movement, the drive gear 34 centerline A3 is coincident with the centerline A1 of the internal gear 16, and the centerline A2 of the planetary gear 26 lies on the centerline A1–O between the axis A1 and fixed point O which is the point of tangency between the gear 34 and the rack 44. The point on the rack Q, is coincident with point O at this starting position. Finally the centerline of the crank 20 is coincident with the line A1–O.

After the crank 20 has rotated through some angle $\theta$, and the point Q has moved through a distance U from its starting position O, the geometric situation shown in FIG. 10 is reached. It can be shown that the angle $\alpha$ is equal to $2 \times \theta$, and further that angle $\beta$ is equal to $\theta$. Furthermore, it can be shown that line T–A3 is equal to O–A1, where point T is the new point of tangency between gear 34 and rack 44; therefore, the tangency point travels along a line along the axis of the rack, keeping the pitch line of the gear 34 in contact with the pitch line of the rack 44.

It may also be shown that the distance L equals $2R \times \sin\theta$, and distance $M = 2R\theta$, where $\theta$ is in radians.
Therefore:

$$U = 2R (\theta - \sin\theta) \quad (1)$$

Therefore, the motion of the rack U as a function of the crank angle $\theta$ is a true cycloidal motion since U and $\theta$ are related by the classical cycloidal equation. By differentiation, the velocity and acceleration are:

$$V = dU/d\theta = 2R (1 - \cos\theta) \quad (2)$$

$$A = d^2U/d\theta^2 = 2R \sin\theta \quad (3)$$

The dwell of the rack 44 may be made practically longer by diverging slightly from the exact geometric conditions described above. If the pitch radius of the gear 34 is decreased slightly to be slightly smaller than the pitch diameter of the planetary gear 26, a very slight displacement reversal occurs about the dwell point. In most applications, this slight reversal is acceptable and can be utilized to significantly improve the practical dwell, while altering the velocity and acceleration characteristics during index very little.

It will be understood that the inherent principle vital to this system is that an eccentric rotating member (gear 34) rotates about a moving axis (A2) while that axis (A2), which has an eccentricity substantially equal to that of the rotating member, rotates about a fixed axis (A1) in the opposite direction at an equal angular velocity.

FIG. 11 shows another system which accomplishes these same objectives in a different manner. Referring to FIG. 11, which is a transverse section through the mechanism, it will be understood that the rack 60 is again suitably guided by rollers or linkages to move in a direction perpendicular to the plane of the drawing. A first gear box 62 and a second gear box 64 are suitably interconnected by a shaft 66 to operate in synchronism as explained below.

The output shaft 68 of the gear reducer 62 rotates about on axis A4; it is formed into a crank cheek 70 and crankshaft 72 which rotates about an axis A5 which is eccentric to the axis A4 by an amount E. A gear 74 is mounted on the crankshaft 72 through bearings 76 and retainer 78. The gear 74 has a pitch radius substantially equal to two times the eccentricity E, and the geometric center of the gear 74 is displaced from its center of rotation, axis A5, by an amount equal to E; furthermore, the teeth on the gear 74 are suitably formed to mesh with the teeth on the rack 60.

A drive collar 80 is fastened to the gear 74 concentric with the axis A5; this drive collar 80 is in turn driven through a universal joint 82, a drive shaft 84 and a second universal joint 86 from the output shaft 88 of the gear reducer 64. It will be understood that the universal joints 82 and 86 may be any one of the many such joints known to the art.

If the output shaft 88 of the gear reducer 64 is synchronized, through the shaft 66, to rotate at an equal angular velocity to that of the output shaft 68 of the gear reducer 62 but in the opposite direction, it can be seen that the resultant motion of the gear 74 will be the same as that of gear 34 in FIG. 10. Therefore, the motion of the rack 60 will again be described by the equations (1), (2) and (3).

It will be understood that the mechanism of FIG. 11 is illustrative only. The coupling achieved by universal joints 82 and 86 together with shaft 84 may also be accomplished by a single joint of the "Oldham" type. The synchronizing shaft 66 may be replaced by a set of sprockets and chain, or suitable toothed belts and pulleys.

While the mechanism shown and the description thereon concerns itself with a stroke having a total length equal to the pitch circumference of the drive gear, it will be understood that, if the output rack is made appropriately long, an output stroke of any number of steps may be generated; where each such step consists of an acceleration-deceleration cycle.

It will be further understood that the mechanism is reversible, i.e., by reversing the direction of the rotary input, the direction of the output motion is reversed. As such, the mechanism is especially useful for creating the reciprocating motion of large masses such as in transfer machines.

It will also be understood that the radius of the drive gear 34 need not be twice the eccentricity between axes A1 and A2. In the case where the drive gear 34 is more than twice this eccentricity, the output rack 44 does not come to a complete stop at the "ends" of a cycle, while in the case where the drive gear 34 is less than twice this eccentricity, the output rack 44 reverses or changes direction at the "end" of the cycle.

I claim:

1. A mechanism for generating a substantially cycloidal output movement comprising:
   a. a support frame,
   b. an input shaft, to be driven by a prime mover, mounted on said frame to rotate about a fixed first axis,
   c. an eccentric shaft having a second axis parallel to said first axis,
   d. a first means mounting said eccentric shaft to revolve about said first axis in response to rotation of said input shaft,
   e. an output member guided in said frame for motion in a prescribed path,
   f. a first rotary member eccentrically journaled on said eccentric shaft and in tangential driving engagement with said output member, and
   g. a second means to cause rotation of said first rotary member on said eccentric shaft at an angular velocity substantially equal to but in a direction opposite to the angular velocity of said eccentric shaft about said input shaft, whereby the motion of the output member varies in a cycloidal manner relative to the acceleration and velocity of the input member.

2. A mechanism as defined in claim 1 in which said first means comprises a crank connection arm between said input shaft and said eccentric shaft.

3. A mechanism as defined in claim 1 in which said first means comprises a crank connection arm between said input shaft and one end of said eccentric shaft and a crank connection arm between the other end of said eccentric shaft and said support frame.

4. A mechanism as defined in claim 1 in which said second means comprises an internal gear on said frame serving as a reaction member, and a planetary gear rotatably mounted on said eccentric shaft meshed with said internal gear and operatively connected with said first rotary member wherein rotation of said planetary gear on said second axis causes rotation of said first rotary member on said second axis.

5. A mechanism as defined in claim 1 in which said first rotary member comprises an external ring gear member, a hub member concentric with said ring gear member rotatably supporting said ring gear member, and means yieldably connecting said members to effect simultaneous rotation thereof in the absence of a threshold load on said ring gear.

6. A mechanism as defined in claim 1 in which said second means comprises a second power input shaft in driving relation to said first rotary member.

7. A mechanism for generating a substantially cycloidal output movement comprising:
   a. a frame,
   b. an input shaft rotatably mounted in said frame and rotating about a fixed first axis,
   c. an eccentric shaft mounted on and parallel with said input shaft to revolve about said first axis,
   d. first drive means to rotate said input shaft about said first axis,
   e. an output member guided in said frame for movement in a prescribed path,
   f. a first rotary member eccentrically journaled on said eccentric shaft and in tangential driving engagement with said output member, and
   g. second drive means to rotate said first rotary member on said eccentric shaft at an angular velocity substantially equal to but in the opposite direction as the angular velocity of said eccentric shaft about said input shaft, whereby the motion of the output member varies in a cycloidal manner relative to the acceleration and velocity of the input member.

8. A mechanism as defined in claim 7 in which the eccentricity of said eccentric shaft with respect to said input shaft is substantially identical with the eccentricity between the geometric center of said first rotary member and the center of rotation of said first rotary member about said second axis.

9. A mechanism as defined in claim 7 in which said second drive means comprises:
   a. a second circular member mounted in said frame with a geometric center coincident with said first axis,
   b. a planetary member journaled on said eccentric shaft and in tangential driving engagement with said second circular member, and
   c. interconnecting means between said planetary member and said first rotary member.

10. A mechanism as defined in claim 9 in which said interconnecting means comprises:
    a. a hub member driven by said planetary member, and on which is journaled said first rotary member, and
    b. elastic detent means between said hub member and said first rotary member.

11. A mechanism as defined in claim 7 in which said second drive means comprises:
    a. a secondary input shaft journaled in said frame to rotate in the opposite direction and at an equal angular velocity as said input shaft, and
    b. second interconnecting means between said secondary input shaft and said first rotary member.

* * * * *